United States Patent [19]

Craft

[11] Patent Number: 5,764,994

[45] Date of Patent: Jun. 9, 1998

[54] METHOD AND SYSTEM FOR COMPRESSING COMPILED MICROCODE TO BE EXECUTED WITHIN A DATA PROCESSING SYSTEM

[75] Inventor: David John Craft, Austin, Tex.

[73] Assignee: International Business Machines Corporation, Armonk, N.Y.

[21] Appl. No.: 711,516

[22] Filed: Sep. 16, 1996

[51] Int. Cl.⁶ .................................................. G06F 9/45
[52] U.S. Cl. .................... 395/709; 395/387; 395/590; 395/598
[58] Field of Search ...................... 395/381, 383, 395/384, 387, 580, 590, 709

[56] References Cited

U.S. PATENT DOCUMENTS

| | | | |
|---|---|---|---|
| 4,355,306 | 10/1982 | Mitchell | 340/347 DD |
| 4,410,916 | 10/1983 | Pratt et al. | 358/263 |
| 4,558,302 | 12/1985 | Welch | 340/347 |
| 4,862,167 | 8/1989 | Copeland, III | 341/107 |
| 4,876,541 | 10/1989 | Storer | 341/51 |
| 5,126,739 | 6/1992 | Whiting et al. | 341/106 |
| 5,146,221 | 9/1992 | Whiting et al. | 341/67 |
| 5,155,484 | 10/1992 | Chambers, IV | 341/55 |
| 5,319,793 | 6/1994 | Hancock et al. | 395/800 |
| 5,353,061 | 10/1994 | Rodriguez et al. | |
| 5,369,605 | 11/1994 | Parks | 364/715.09 |
| 5,398,319 | 3/1995 | Sakamura et al. | 395/375 |
| 5,414,425 | 5/1995 | Whiting et al. | 341/67 |
| 5,414,833 | 5/1995 | Hershey et al. | 395/575 |
| 5,463,390 | 10/1995 | Whiting et al. | 341/51 |
| 5,632,024 | 5/1997 | Yajima et al. | 395/381 |
| 5,652,852 | 7/1997 | Yokota | 395/384 |

FOREIGN PATENT DOCUMENTS 1 598 342  9/1981  United Kingdom.

OTHER PUBLICATIONS

IBM Technical Disclosure Bulletin, vol. 34, No. 6, Nov. 1991 "Enhancing Board Functional Self-Test by Concurrent Sampling".

IBM Technical Disclosure Bulletin, vol. 37, No. 04B, Apr. 1994 "Acceleration of Multimedia Applications Using Branch Conditional to Previous Target Instruction".

*Primary Examiner*—William M. Treat
*Attorney, Agent, or Firm*—Casimer K. Salys; Antony P. Ng; Andrew J. Dillon

[57] ABSTRACT

A method for compressing a set of compiled microcode to be utilized within a data processing system is disclosed. In accordance with the method and system of the present invention, all branch instructions within a set of compiled microcode are first identified. Then, the set of compiled microcode is parsed into a number of microcode segments such that each microcode segment begins at an instruction following each identified branch instruction or at a target address of each identified branch instruction. Subsequently, each of these microcode segments is individually translated to its compressed form by utilizing a data-compression routine. Finally, all the compressed microcode segments are concatenated together and linked by inserting branch instructions with modified target address, to yield a set of compressed executable microcode. By doing so, the required memory for storing the compressed executable microcode is reduced.

10 Claims, 3 Drawing Sheets

METHOD AND SYSTEM FOR COMPRESSING COMPILED MICROCODE TO BE EXECUTED WITHIN A DATA PROCESSING SYSTEM

BACKGROUND OF THE INVENTION

1. Technical Field

The present invention relates to an improved method and system for data processing in general and, in particular, to an improved method and system for data compression. Still more particularly, the present invention relates to an improved method and system for compressing a set of compiled microcode to be executed within a data processing system.

2. Description of the Prior Art

A monolithic embedded data processing system typically comprises three major components, namely, a central processing unit, a non-volatile memory, and a random access memory. A sequence of executable microcode, commonly known as firmware, intended for a specific application may be stored within the non-volatile memory. During operation, this sequence of executable microcode is loaded from the non-volatile memory to the central processing unit for subsequent execution. The random access memory can be utilized for storing data or may be served as an instruction cache.

Because of their high-performance, low-power consumption, and relatively small silicon area-requirement, RISC (reduced instruction set computer) architecture microprocessors and microcontrollers are becoming a preferred choice as the central processing unit for monolithic embedded data processing systems over their CISC (complex instruction set computer) counterparts. However, even though RISC microprocessors and microcontrollers are smaller and have lower power consumption, particularly at the more moderate performance levels, most RISC microprocessors and microcontrollers require a larger amount of code to perform any given task as compared to CISC processors. Depending on the architecture of the microprocessor and the embedded data processing system application, a RISC microcode module is typically 20% to 50% larger than an equivalent CISC microcode module. This translates to a higher memory cost, because additional non-volatile memory must be utilized to store the microcode. Incidentally, this will result in an overall larger chip which translates to a higher overall system cost.

Consequently, it would be desirable to provide an improved method and system to compress a set of compiled microcode to be utilized within an embedded data processing system such that the memory requirement for microcode storage can be reduced.

SUMMARY OF THE INVENTION

In view of the foregoing, it is therefore an object of the present invention to provide an improved method and system for data processing.

It is another object of the present invention to provide an improved method and system for compressing data.

It is yet another object of the present invention to provide an improved method and system for compressing a set of compiled microcode to be utilized within a data processing system.

In accordance with the method and system of the present invention, all branch instructions within a set of compiled microcode are first identified. Then, the set of compiled microcode is parsed into some number of microcode segments such that each microcode segment begins at an instruction following each identified branch instruction or at a target address of each identified branch instruction. Subsequently, each of these microcode segments is individually translated to its compressed form by utilizing a data-compression routine. Finally, all the compressed microcode segments are concatenated together and linked by modifying the target address of each branch instruction accordingly to yield a set of compressed executable microcode. By doing so, the required memory for storing the compressed executable microcode is reduced.

All objects, features, and advantages of the present invention will become apparent in the following detailed written description.

BRIEF DESCRIPTION OF THE DRAWINGS

The invention itself, as well as a preferred mode of use, further objects, and advantages thereof, will best be understood by reference to the following detailed description of an illustrative embodiment when read in conjunction with the accompanying drawings, wherein.

DETAILED DESCRIPTION OF A PREFERRED EMBODIMENT

In the following description, numerous specific details are set forth, such as device types, number of bits, attributes, etc., in order to provide a thorough understanding of the present invention. However it will be obvious to those skilled in the art that the present invention may be practiced without these specific details. On the contrary, various well-known elements are not shown or described in detail in order to avoid any unnecessary obscuring of the present invention.

Figure 1:
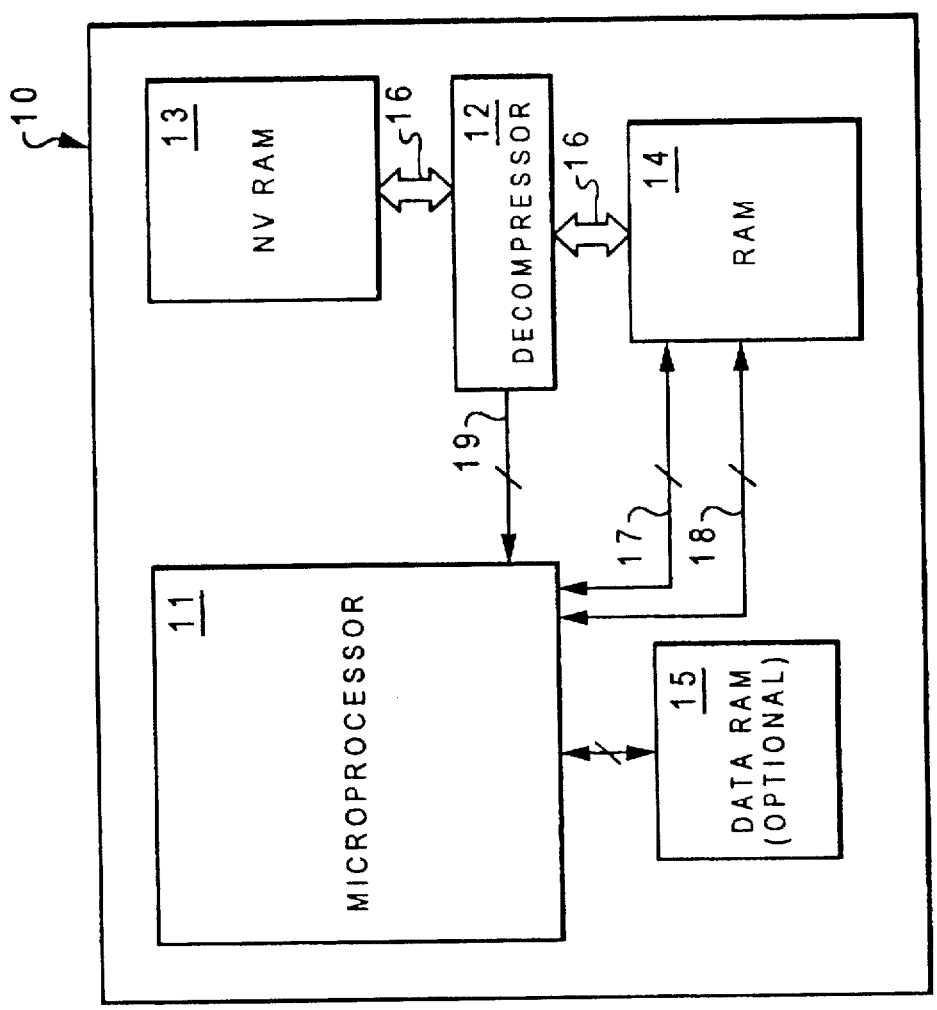
FIG. 1 is a block diagram of a monolithic embedded data processing system having a data decompression circuit, in which the present invention may be implemented.

Referring now to the drawings and in particular to FIG. 1, there is illustrated a block diagram of a monolithic data processing system having a data decompression circuit, in which the present invention may be applicable. As shown, monolithic data processing system 10 comprises a microprocessor (or microcontroller) 11, a decompressor 12, a non-volatile random access memory (NVRAM) 13, a random access memory (RAM) 14, and an optional data RAM 15. Decompressor 12 is coupled between NVRAM 13 and RAM 14 via bus 16, though RAM 14 may be incorporated within decompressor 12. As a separate unit from decompressor 12; however, RAM 14 is coupled to microprocessor 11 via address bus 17 and data bus 18. In addition, NVRAM 13 may be a read only memory (ROM).

Compressed executable microcode is initially preloaded within NVRAM 13. The compressed executable microcode is subsequently decompressed by decompressor 12 back its original form and sent to microprocessor 11 via bus 19 for execution. Depending on the compression algorithm utilized, the presence of RAM 14 may or may not be required. Nevertheless, RAM 14 can also be functioned as an instruction cache for microprocessor 11. Because only executable microcode is stored in RAM 14, an optional data RAM 15 may be added for storing data should an application demand such.

An adaptive data compression algorithm may be utilized to perform the initial compression of microcode. The compressed microcode is then translated back to its original form via decompressor 12 before the microcode is sent to microprocessor 11 for execution. During the decompression of the microcode, depending on the chosen adaptive data compression algorithm, a history table or a dictionary will be constructed. This history table or dictionary, being constructed simultaneously with the data decompression, may be stored in RAM 14.

Compression of executable microcode

Figure 2:
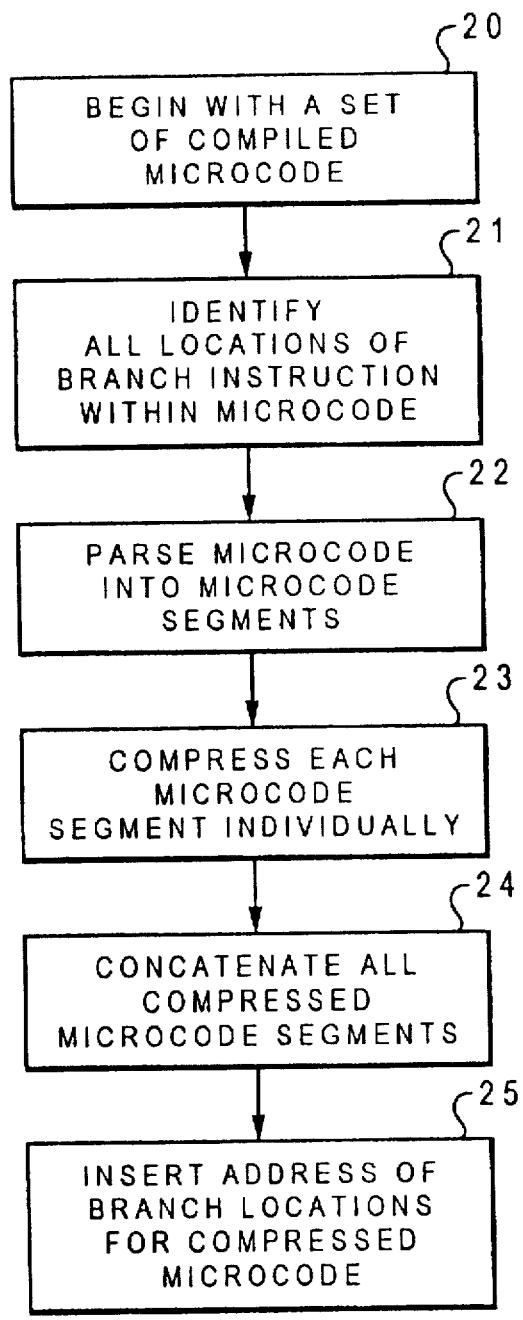
FIG. 2 is a high-level logic flow diagram of a method for compressing a set of compiled microcode to be utilized within the embedded data processing system of FIG. 1, in accordance with a preferred embodiment of the invention.

With reference now to FIG. 2, there is illustrated a high-level logic flow diagram of a method for compressing a set of compiled microcode to be utilized within the monolithic data processing system of FIG. 1, in accordance with a preferred embodiment of the invention. The method begins with a set of compiled microcode (or object microcode), as depicted in block 20. A standard compiler may be utilized to yield such a set of compiled microcode. Then, by utilizing a well-known technique typically performed in a standard linker, an address location of each branch instruction within this set of compiled microcode may be identified, as shown in block 21. This set of compiled microcode is then parsed into some number of microcode segments, as depicted in block 22. Each of these microcode segments begins after an identified branch instruction or at a target address of an identified branch instruction and ends just before another branch instruction. Subsequently, each of these microcode segments is individually compressed by utilizing a data-compressing routine, as illustrated in block 23. Theoretically, any data compression algorithm should suffice for this purpose; however, a preferred algorithm that is more suitable for the present invention will be discussed infra. All the individual compressed microcode segments are concatenated together with the uncompressed branch instructions to yield a compressed executable microcode image, as shown in block 24. Finally, the compressed segments comprising executable microcode image are linked by inserting the correct target address within each branch instruction in its uncompressed form, as depicted in block 25.

The present invention, as shown in block 21 through block 25, is preferably performed by a special linker that is able to link microcode segments in their compressed form. Aside from the function of linking microcode segments in their compressed form, this special linker is similar to a standard linker in all other aspects and should be well-known to those ordinarily skilled in the relevant art.

Under the present invention, the microcode compression is basically dictated by the branch points and entry points within the set of compiled microcode. With very few exceptions, the best strategy, as illustrated in FIG. 2, is to compress all in-line code sequences as one block of code, regardless of the length, from an entry-point up to an unconditional or non-local branch-point. Thus, when the set of compiled microcode has a lot of very short in-line code sequences and frequent branches, a data compression algorithm that is effective for data block sizes even down to only a few tens of bytes may be more availing to the present invention.

Furthermore, the data compression algorithm must be amenable to a high-speed hardware implementation in a small area while able to achieve a sufficiently good compression ratio. Based on all the selection criteria mentioned above, adaptive data compression algorithms such as Lempel-Ziv 1 (also known as Lempel-Ziv 77) and its variants seem to be a preferable choice for the implementation of the present invention. Lempel-Ziv 1 and Lempel-Ziv 2 (also known as Lempel-Ziv 78), and some of their variants are described in detail in *Data Compression Book* by Mark Nelson (ISBN: 1-55851-214-4), and is incorporated by reference herein.

It is well-known in the art that, when utilizing a Lempel-Ziv 1 type of algorithm, a history table will be constructed along with the decompression. In order to further facilitate the decompression process, the history table may be preloaded with data that are appropriate to the executable microcode. The type of preload data depends upon a specific application for which the microcode modules are built, but essentially preload data contain instructions or code fragments that are utilized frequently within the microcode for that specific application. This will allow the smaller microcode segments to be decompressed more effectively, because a somewhat relevant history table is readily available at the beginning of the decompression operation. As a result, the pre-determined history is always utilized at the start of decompression of a block of microcode, but the adaptive nature of the algorithm is still retained.

Figure 3:
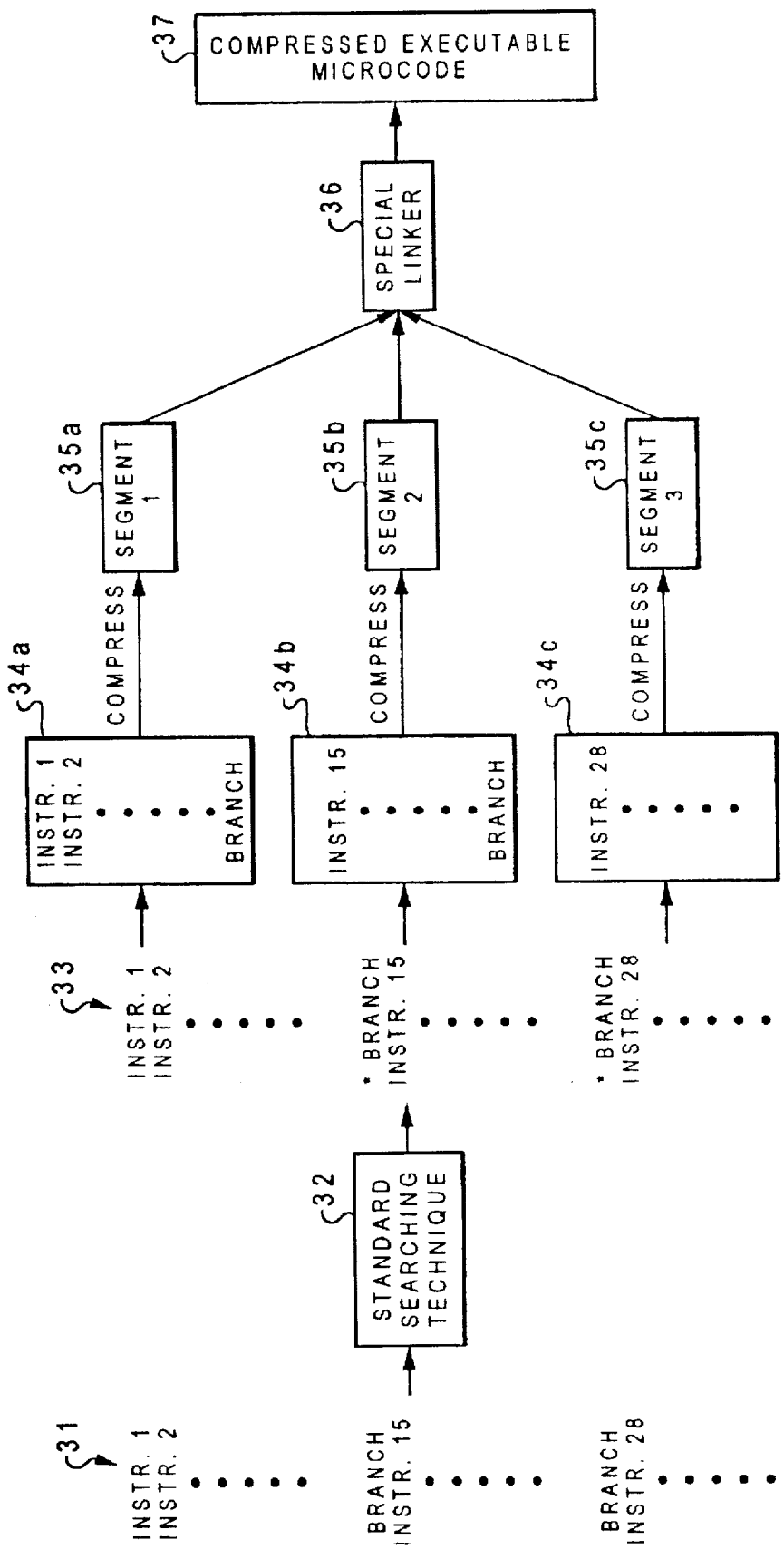
FIG. 3 is a graphical depiction of the method for compressing a set of compiled microcode as described in FIG. 2.

Referring now to FIG. 3, there is a graphical depiction of the method for compressing a set of compiled microcode as described in FIG. 2. As shown, a standard searching technique 32 is first applied to a set of compiled microcode 31 in order to identify the locations of all branch instructions (or their equivalents) within compiled microcode 31. For the purpose of illustration, the locations of these branch instructions are signified by an asterisk in compiled microcode 33. Compiled microcode 33 is then parsed into several microcode segments 34a, 34b, and 34c, with each microcode segment beginning with an instruction after each identified branch instruction. However, some microcode segments may begin at the target address of an identified branch instruction (not shown). Subsequently, each of microcode segments 34a–34c is compressed individually by utilizing a preferred data-compressing routine as discussed above. Finally, all compressed microcode segments 35a–35c are concatenated by special linker 36 in order to produce a set of compressed executable microcode 37. The branch addresses for all the previously identified branch instructions within compressed executable microcode 37 are also inserted by special linker 36 at this point. These branch addresses refer to the addresses in the compressed microcode image and not the "original" uncompressed microcode image.

Code decompression along with concurrent code execution

The basic principle employed by the monolithic data-processing system of FIG. 1 is to decompress the compressed microcode stored in the NVRAM as needed and to execute it concurrently as the instructions emerge from the decompressor.

According to a preferred embodiment of the invention, there are four EXECUTION_SEGMENT buffers residing in RAM 14. A preferred way of assigning the number of EXECUTION_SEGMENT buffers within RAM 14 is based on the number of interrupt levels microprocessor 11 can handle. In this case, microprocessor 11 has four levels of interrupts.

In a preferred embodiment, decompressor 12 of FIG. 1 has its own DMA registers such that it is a self-contained decompression engine. During operation, all decompressor 12 requires is a starting address for a compressed microcode segment, and which one of the four EXECUTION_SEGMENTS is to be the target. Then, decompressor 12 is able to fetch, decompress, and load the microcode segment without further intervention.

If decompressor 12 is able to output instructions at rates that match the instruction-fetching rate of microprocessor 11, it is possible to execute the instructions directly as they are available. Nevertheless, the microcode is still sent to the specified EXECUTION_SEGMENT buffer within RAM 14 in order to provide an updated history for the decompression process in case of a local branch back. Initially, microcode is always stored at the starting address of the specified EXECUTION_SEGMENT buffer, and execution of each instruction is performed as it is stored.

Execution of "In-Line" code

This is a fairly straightforward situation. Microcode sequences of almost any length can be fetched, decompressed, and executed without any impact on the performance. Only a single EXECUTION_SEGMENT buffer is needed because both an output DMA address register of the decompressor and an instruction counter of the microprocessor will wrap around the starting address of the same EXECUTION_SEGMENT buffer as many times as necessary.

Furthermore, if the decompressor and the microprocessor have some sort of synchronous logic operating between them as well as sharing the same clock, it is only necessary to delay the starting of the microprocessor a few cycles until the first instruction is available from the decompressor. Microcode execution can then continue at full speed, for the rest of the in-line code, regardless of its length.

Local Backward Branch

Local backward branch is defined as a branch to a target instruction address within the current EXECUTION_SEGMENT buffer that holds a valid microcode segment. Backward branches that jump to a target instruction address which is more than the size of the EXECUTION_SEGMENT buffer cannot be considered as local because the target code would have been overwritten.

Consider a microcode segment that is being decompressed and executed into a 64-word EXECUTION_SEGMENT buffer. Suppose only nine instructions from the microcode segment have been processed so far and a branch instruction is the next instruction in the microcode sequence. Target addresses 000 through 009 are acceptable for this situation. Once 64 or more instructions are processed, a branch target address up to 63 instructions back in the microcode segment would not cause a problem. The target address would simply be wrapping around the EXECUTION_SEGMENT buffer address space, and the instruction counter is set to get the instruction from the EXECUTION_SEGMENT buffer, decode the instruction, and then execute the instruction.

Control of the decompressor for local backward branches may be achieved by halting the decompressor clock for a few cycles and restarting the decompressor clock when an instruction counter within the microprocessor is once again at the decompressor DMA output address value of the EXECUTION_SEGMENT buffer. This saves power and prevents the decompressor from running ahead unnecessarily. This also avoids the necessity of having an end-marker to be contained within the compressed microcode.

Local backward branches have little impact on the performance of the microprocessor, if they are implemented in this fashion. A 64-word size EXECUTION_SEGMENT buffer will probably allow the majority of code count loops to be executed at full speed.

Local forward branch

Local forward branch is the only case that poses a fundamental performance problem because all microcode execution must be delayed until the decompressor has had time to be able to decompress up as far as the target instruction. A hardware interlock can be arranged to ensure a target instruction is not decoded by the microprocessor before it is available at the output from the decompressor. Such hardware interlock can simply comprise of a counter loaded up with a fixed number of clock cycles for which the microprocessor must wait before the target instruction is reached by the decompressor. Afterwards, the microprocessor execution will be resumed as usual.

There is no other way to avoid this wait time, unfortunately, if these local forward branches are to be allowed. In fact, it may even be more preferable to treat most forward branches as non-local because there is only a one- or two-cycle penalty at the most for such treatment. Otherwise, only very short forward branches, in the range of one or two instructions ahead, are best treated as local, because of the delays involved.

Non-local branches

For branches which do not fall into the category of local branch, it is assumed that the target address is always at the start of a different microcode segment. A new starting address for the new microcode segment must be provided to the decompressor in order for the decompressor to fetch and decode. Microcode execution can then begin, and once again, the instruction counter of the microprocessor is set to the beginning of the specified EXECUTION_SEGMENT buffer.

Since all such branches will now, in effect, be to the same location, at the start of the EXECUTION_SEGMENT buffer, it is probably better to modify the interpretation of the address portion of the branch instructions. If a branch is not taken, or is to be taken and the target address, as defined above, is local, execution continues normally from the current microcode segment within the history table. If it is not a local branch, the entire address field can be passed to the decompressor. Part of the field can be interpreted as the starting address for a new microcode segment in compressed microcode space, and the remainder specifies a target EXECUTION_SEGMENT buffer in which the decompressed microcode is stored.

The instruction counter of the microprocessor is then set to the base address of this EXECUTION_SEGMENT buffer, and the microprocessor clock is allowed to run once the first instruction of the new microcode segment is available out of the decompressor.

After partitioning the microcode into various microcode segments and the subsequent compression, the special linker, as mentioned previously, must determine their locations within the final compressed microcode set, and must modify the addressing fields and insert the branch instructions accordingly. All local branches will be modified so that their target addresses are within the address range of the EXECUTION_SEGMENT buffer, but the non-local branches will have a target address beyond the history table. As an example, consider a data processing system with a history table containing a total of four EXECUTION_SEGMENTS buffers, each of 64 words. The word addresses in the EXECUTION_SEGMENTS thus range from $000_{hex}$ through $0FF_{hex}$.

The addressing space can also range from $000_{hex}$ upwards, if words $000_{hex}$ through $0FF_{hex}$ are reserved for some purpose other than compressed microcode segment storage (data tables, for example). If this is done, it is quite a simple matter to interpret an instruction fetch from less than $100_{hex}$ as a local branch, while an address of $100_{hex}$ or more is interpreted as specifying a switch to a new microcode segment with possibly a different target segment in the EXECUTION_SEGMENT buffer as well.

In this case, the decompressor is reset, and its DMA registers are set up with new values from the effective address field. If 26-bit address fields were implemented, for example, the high-order 2 bits could be the segment number in the EXECUTION_SEGMENT buffer, leaving a 24-bit word address, for the starting address of the compressed microcode segment itself. This allows 64 MBytes of memory storage space or 128 MBytes of code at a 2:1 code compression ratio. (note: a word is assumed to be 4 bytes).

As has been described, the present invention provides an improved method and system for compressing a set of compiled microcode to be utilized within an embedded data processing system. Under the present invention, the set of microcode is split into several variable-size microcode segments, and each of these microcode segments is compressed individually and separately to allow subsequent random access. Each compressed microcode segment is required to begin on a fresh word boundary. Although this method wastes, on average, one-half of a control word per compressed microcode segment, an overall size reduction of approximately 1.2–1.5 times is typically achieved utilizing the present invention. As such, the memory requirement for microcode storage within an embedded data processing system can be reduced significantly.

Furthermore, the approach of storing the executable microcode in a compressed form and then expanding the compressed microcode dynamically at execution time, by utilizing a high-speed decompression circuit, for a monolithic embedded data processing system design is introduced in the present invention. This approach offers several significant advantages in the low-cost/high-volume market segment of embedded data processing systems for which modest performance is acceptable, especially when full-performance capability of the central processing unit is of less concern than power dissipation and overall system cost.

While the invention has been particularly shown and described with reference to a preferred embodiment, it will be understood by those skilled in the art that various changes in form and detail may be made therein without departing from the spirit and scope of the invention.

What is claimed is:

1. A method for compressing a set of compiled microcode to be utilized within a data processing system, said method comprising the steps of:

identifying all branch instructions within said set of compiled microcode;

parsing said set of compiled microcode into a plurality of microcode segments, wherein each microcode segment begins at an instruction after each identified branch instruction or at a target instruction of each identified branch instruction;

compressing each of said plurality of microcode segments by utilizing a data-compression routine;

concatenating all of said plurality of compressed microcode segments to yield a set of compressed executable microcode; and linking said set of compressed executable microcode by inserting each identified branch instruction with a modified target address, such that the memory requirement for microcode storage is reduced.

2. The method for compressing a set of compiled microcode to be utilized within a data processing system according to claim 1, wherein said identifying step is performed by a special linker.

3. The method for compressing a set of compiled microcode to be utilized within a data processing system according to claim 1, wherein said concatenating step and said linking step are performed by a special linker.

4. The method for compressing a set of compiled microcode to be utilized within a data processing system according to claim 1, wherein said compressing step is performed by utilizing a Lempel-Ziv 1 adaptive compression routine.

5. A monolithic data processing system for processing a set of compiled microcode, wherein said monolithic data processing system comprising:

a non-volatile memory having a set of compressed executable microcode, wherein said set of compressed executable microcode is formed by compressing a plurality of microcode segments utilizing a data-compression routine, wherein each of said plurality of microcode segments begins at an instruction after each identified branch instruction or at a target instruction of each identified branch instruction of a set of compiled microcode, as a result of parsing said set of compiled microcode;

a decompressor circuit coupled to said non-volatile memory for performing decompression of said compressed executable microcode; and a central processing unit coupled to said decompressor circuit for executing said decompressed executable microcode.

6. The monolithic data processing system according to claim 5, wherein said monolithic data processing system further comprises a random access memory for storing a history during the decompression of said compressed executable microcode.

7. The monolithic data processing system according to claim 5, wherein said compressed executable microcode is obtained by compression of a set of executable microcode in a segment basis, wherein each segment is grouped according to a branch point or an entry point for a branch instruction.

8. The monolithic data processing system according to claim 5, wherein said non-volatile memory is a non-volatile random access memory.

9. The monolithic data processing system according to claim 5, wherein said non-volatile memory is a read only memory.

10. The monolithic data processing system according to claim 5, wherein said random access memory comprises a plurality of EXECUTION_SEGMENTS.

\* \* \* \* \*